(12) United States Patent
Yang et al.

(10) Patent No.: US 8,614,858 B2
(45) Date of Patent: Dec. 24, 2013

(54) SYSTEMS AND METHODS FOR SYNC MARK DETECTION METRIC COMPUTATION

(75) Inventors: Shaohua Yang, San Jose, CA (US); Dahua Qin, Allentown, PA (US)

(73) Assignee: LSI Corporation, San Jose, CA (US)

( * ) Notice: Subject to any disclaimer, the term of this patent is extended or adjusted under 35 U.S.C. 154(b) by 365 days.

(21) Appl. No.: 12/946,033

(22) Filed: Nov. 15, 2010

(65) Prior Publication Data

US 2012/0120784 A1    May 17, 2012

(51) Int. Cl.
  *G11B 5/09*   (2006.01)
(52) U.S. Cl.
  USPC ............. 360/51; 360/48; 360/53; 360/77.02; 375/341
(58) Field of Classification Search
  None
  See application file for complete search history.

(56) References Cited

U.S. PATENT DOCUMENTS

| | | | |
|---|---|---|---|
| 3,654,390 A * | 4/1972 | Puckette | ............. 375/368 |
| 3,973,182 A | 8/1976 | Kataoka | |
| 3,973,183 A | 8/1976 | Kataoka | |
| 4,024,571 A | 5/1977 | Dischert et al. | |
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,668,679 A | 9/1997 | Swearingen et al. | |
| 5,696,639 A | 12/1997 | Spurbeck et al. | |
| 5,781,129 A | 7/1998 | Schwartz et al. | |
| 5,787,125 A | 7/1998 | Mittle | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,892,632 A | 4/1999 | Behrens | |
| 5,936,558 A * | 8/1999 | Shafiee et al. | ............. 341/59 |
| 5,955,783 A | 9/1999 | Ben-Efraim | |
| 5,970,104 A | 10/1999 | Zhong et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/633,319, filed Dec. 7, 2009, Ratnakar Aravind.

(Continued)

*Primary Examiner* — Dismery Mercedes
(74) *Attorney, Agent, or Firm* — Hamilton DeSanctis & Cha

(57) ABSTRACT

Various embodiments of the present invention provide systems and methods for data processing. As an example, a pattern detection circuit is discussed that includes a distance calculation circuit and a comparator circuit. The distance calculation circuit is operable to calculate a noise whitened distance between a reference signal and a received input to yield a comparison value. The comparator circuit is operable to compare the comparison value with a threshold value.

20 Claims, 5 Drawing Sheets

(56) References Cited

U.S. PATENT DOCUMENTS

| | | | | |
|---|---|---|---|---|
| 6,069,583 | A | 5/2000 | Silvestrin et al. | |
| 6,081,397 | A | 6/2000 | Belser | |
| 6,111,712 | A | 8/2000 | Vishakhadatta et al. | |
| 6,128,358 | A * | 10/2000 | Urata | 375/366 |
| 6,185,175 | B1 * | 2/2001 | Zook | 369/53.35 |
| 6,208,478 | B1 | 3/2001 | Chiu et al. | |
| 6,233,715 | B1 * | 5/2001 | Kuki et al. | 714/795 |
| 6,278,591 | B1 | 8/2001 | Chang | |
| 6,400,518 | B1 | 6/2002 | Bhaumik et al. | |
| 6,404,829 | B1 | 6/2002 | Sonu | |
| 6,411,452 | B1 | 6/2002 | Cloke | |
| 6,441,661 | B1 | 8/2002 | Aoki et al. | |
| 6,460,150 | B1 * | 10/2002 | Cideciyan et al. | 714/709 |
| 6,470,047 | B1 * | 10/2002 | Kleinerman et al. | 375/232 |
| 6,490,110 | B2 | 12/2002 | Reed et al. | |
| 6,493,162 | B1 | 12/2002 | Fredrickson | |
| 6,519,102 | B1 | 2/2003 | Smith | |
| 6,530,060 | B1 | 3/2003 | Vis et al. | |
| 6,603,622 | B1 | 8/2003 | Christiansen et al. | |
| 6,606,048 | B1 | 8/2003 | Sutardja | |
| 6,633,447 | B2 | 10/2003 | Franck et al. | |
| 6,646,822 | B1 | 11/2003 | Tuttle et al. | |
| 6,657,802 | B1 * | 12/2003 | Ashley et al. | 360/51 |
| 6,775,529 | B1 | 8/2004 | Roo | |
| 6,788,484 | B2 | 9/2004 | Honma | |
| 6,813,108 | B2 | 11/2004 | Annampedu et al. | |
| 6,816,328 | B2 | 11/2004 | Rae | |
| 6,839,014 | B2 | 1/2005 | Uda | |
| 6,856,183 | B2 | 2/2005 | Annampedu | |
| 6,856,480 | B2 * | 2/2005 | Kuki et al. | 360/49 |
| 6,876,511 | B2 | 4/2005 | Koyanagi | |
| 6,912,099 | B2 | 6/2005 | Annampedu et al. | |
| 6,940,800 | B2 * | 9/2005 | Fujimoto et al. | 369/59.22 |
| 6,963,521 | B2 | 11/2005 | Hayashi | |
| 6,999,257 | B2 | 2/2006 | Takeo | |
| 6,999,264 | B2 | 2/2006 | Ehrlich | |
| 7,002,761 | B1 | 2/2006 | Sutardja et al. | |
| 7,002,767 | B2 | 2/2006 | Annampedu et al. | |
| 7,038,875 | B2 | 5/2006 | Lou et al. | |
| 7,054,088 | B2 | 5/2006 | Yamazake et al. | |
| 7,054,398 | B1 * | 5/2006 | Wu et al. | 375/354 |
| 7,072,137 | B2 | 7/2006 | Chiba | |
| 7,082,005 | B2 | 7/2006 | Annampedu et al. | |
| 7,092,462 | B2 | 8/2006 | Annampedu et al. | |
| 7,116,504 | B1 | 10/2006 | Matsoberg | |
| 7,126,776 | B1 | 10/2006 | Warren, Jr. et al. | |
| 7,136,250 | B1 | 11/2006 | Wu et al. | |
| 7,154,689 | B1 | 12/2006 | Shepherd et al. | |
| 7,167,328 | B2 | 1/2007 | Annampedu et al. | |
| 7,180,693 | B2 | 2/2007 | Annampedu et al. | |
| 7,187,739 | B2 | 3/2007 | Ma | |
| 7,191,382 | B2 | 3/2007 | James et al. | |
| 7,193,544 | B1 | 3/2007 | Fitelson et al. | |
| 7,193,798 | B2 | 3/2007 | Byrd et al. | |
| 7,199,961 | B1 | 4/2007 | Wu et al. | |
| 7,203,013 | B1 | 4/2007 | Han et al. | |
| 7,206,146 | B2 | 4/2007 | Flynn et al. | |
| 7,230,789 | B1 | 6/2007 | Brunnett et al. | |
| 7,248,425 | B2 | 7/2007 | Byun et al. | |
| 7,253,984 | B1 | 8/2007 | Patapoutian et al. | |
| 7,265,937 | B1 | 9/2007 | Erden et al. | |
| 7,301,717 | B1 | 11/2007 | Lee et al. | |
| 7,308,057 | B1 | 12/2007 | Patapoutian | |
| 7,323,916 | B1 | 1/2008 | Sidiropoulos et al. | |
| 7,362,536 | B1 | 4/2008 | Liu et al. | |
| 7,375,918 | B1 | 5/2008 | Shepherd et al. | |
| 7,411,531 | B2 | 8/2008 | Aziz et al. | |
| 7,420,498 | B2 | 9/2008 | Barrenscheen | |
| 7,423,827 | B2 | 9/2008 | Neville et al. | |
| 7,446,690 | B2 | 11/2008 | Kao | |
| 7,499,238 | B2 | 3/2009 | Annampedu | |
| 7,525,460 | B1 | 4/2009 | Liu et al. | |
| 7,561,649 | B2 * | 7/2009 | Ashley et al. | 375/365 |
| 7,602,568 | B1 | 10/2009 | Katchmart | |
| 7,620,101 | B1 | 11/2009 | Jenkins | |
| 7,630,155 | B2 | 12/2009 | Maruyama et al. | |
| 7,702,991 | B2 * | 4/2010 | Haratsch | 714/796 |
| 7,760,454 | B1 * | 7/2010 | Han et al. | 360/40 |
| 7,881,164 | B1 * | 2/2011 | Han et al. | 369/44.11 |
| 7,974,034 | B1 * | 7/2011 | Han et al. | 360/51 |
| 8,261,171 | B2 * | 9/2012 | Annampedu | 714/795 |
| 2002/0001151 | A1 | 1/2002 | Lake | |
| 2002/0150179 | A1 | 10/2002 | Leis et al. | |
| 2002/0176185 | A1 | 11/2002 | Fayeulle et al. | |
| 2002/0181377 | A1 | 12/2002 | Nagata et al. | |
| 2003/0095350 | A1 | 5/2003 | Annampedu et al. | |
| 2004/0179460 | A1 | 9/2004 | Furumiya et al. | |
| 2005/0046982 | A1 | 3/2005 | Liu et al. | |
| 2005/0157415 | A1 | 7/2005 | Chiang | |
| 2005/0243455 | A1 | 11/2005 | Annampedu | |
| 2006/0233287 | A1 * | 10/2006 | Yang et al. | 375/341 |
| 2006/0280093 | A1 * | 12/2006 | Nagai et al. | 369/59.22 |
| 2007/0064847 | A1 | 3/2007 | Gaedke | |
| 2007/0071152 | A1 | 3/2007 | Chen et al. | |
| 2007/0103805 | A1 | 5/2007 | Hayashi | |
| 2007/0104300 | A1 | 5/2007 | Esumi et al. | |
| 2007/0183073 | A1 | 8/2007 | Sutardja et al. | |
| 2007/0230015 | A1 | 10/2007 | Yamashita | |
| 2007/0263311 | A1 | 11/2007 | Smith | |
| 2007/0297079 | A1 * | 12/2007 | Motwani | 360/51 |
| 2008/0056403 | A1 | 3/2008 | Wilson | |
| 2008/0080082 | A1 | 4/2008 | Erden et al. | |
| 2008/0212715 | A1 | 9/2008 | Chang | |
| 2008/0266693 | A1 | 10/2008 | Bliss et al. | |
| 2009/0002862 | A1 | 1/2009 | Park | |
| 2009/0142620 | A1 | 6/2009 | Yamamoto et al. | |
| 2009/0245448 | A1 | 10/2009 | Ran et al. | |
| 2009/0274247 | A1 | 11/2009 | Galbraith et al. | |

OTHER PUBLICATIONS

U.S. Appl. No. 12/851,475, filed Aug. 5, 2010, Annampedu, Viswanath.
U.S. Appl. No. 12/887,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/955,789, filed Nov. 29, 2010, Annampedu et al.
U.S. Appl. No. 12/955,821, filed Nov. 29, 2010, Annampedu et al.
Annampedu and Aziz, "Adaptive Algorithms for Asynchronous Detection of Coded Servo Signals Based on Interpolation", IEEE Transactions on Magnetics, vol. 41, No. 10, Oct. 20, 2005.
Aziz and Annampedu, "Asynchronous Maximum Likelihood (ML) Detection of Servo repeatable Run Out (RRO) Data".
Aziz, Annampedu, "Interpolation Based Max.-Likelihood(ML) Detection Asynchronous Servo Repeatable Run Out Data", Digest, IEEE Int'l Mag. Conf. vol. 42 No. 10 pp. 2585-2587 Oct. 2006.

* cited by examiner

SYSTEMS AND METHODS FOR SYNC MARK DETECTION METRIC COMPUTATION

BACKGROUND OF THE INVENTION

The present inventions are related to systems and methods for data processing, and more particularly to systems and methods for detecting patterns in a data stream.

Various circuits have been developed that provide for identifying synchronization marks within a data stream. As an example, a synchronization mark may be identified by calculating a Euclidean distance between a data set and a reference signal. The calculated Euclidean distance is then compared to a threshold value. Where the Euclidean distance is found to be less than the threshold value, a sync mark is said to have been found. In some cases, a sync mark may be improperly indicated or a sync mark may be missed due to noise.

Hence, for at least the aforementioned reasons, there exists a need in the art for advanced systems and methods for sync mark identification.

BRIEF SUMMARY OF THE INVENTION

The present inventions are related to systems and methods for data processing, and more particularly to systems and methods for detecting patterns in a data stream.

Various embodiments of the present invention provide pattern detection circuits that include a distance calculation circuit and a comparator circuit. The distance calculation circuit is operable to calculate a noise whitened distance between a reference signal and a received input to yield a comparison value. The comparator circuit is operable to compare the comparison value with a threshold value. In some instances of the aforementioned embodiments, the comparator circuit is further operable to assert a pattern found signal when the comparison value is less than the threshold value.

In various instances of the aforementioned embodiments, the distance calculation circuit includes: a difference circuit, a noise whitening filter and a multiplier circuit. The difference circuit is operable to calculate a difference between the reference signal and the received input at a bit position to yield a difference value. The noise whitening filter is operable to noise whiten the difference value to yield a noise whitened output. The multiplier circuit is operable to square the noise whitened output to yield a squared output. In some cases, the bit position is a first bit position, the difference value is a first difference value, the noise whitened output is a first noise whitened output, and the squared output is a first squared output. In such cases, the difference circuit is further operable to calculate a difference between the reference signal and the received input at a second bit position to yield a second difference value; the noise whitening filter is further operable to noise whiten the second difference value to yield a second noise whitened output; the multiplier circuit is operable to square the second noise whitened output to yield a second squared output; and an accumulator circuit operable to sum at least the first squared output and the second squared output to yield the comparison value.

In one or more instances of the aforementioned embodiments, the circuit further includes a pattern register operable to maintain the reference signal. In particular cases, the pattern register is programmable. In some instances of the aforementioned embodiments, the comparison value is calculated in accordance with the following equation:

$$\text{comparison output} = \sum_{i=0}^{l}\left[\sum_{k=0}^{m} f_k(\text{received input}_{i-k} - \text{reference signal}_{i-k})\right]^2,$$

wherein l corresponds to the number of bit positions of the reference signal, m corresponds to the number of taps of a noise whitening filter, i–k corresponds to a particular bit position, and $f_k$ represents a particular tap of the noise whitening filter.

Other embodiments of the present invention provide methods for pattern detection. Such methods include: receiving a data input; receiving a reference signal; calculating a difference between the reference signal and the received input at a bit position to yield a difference value; noise whitening the difference value to yield a noise whitened output; and calculating a distance between the data input and the reference signal based at least in part on the noise whitened output to yield a comparison value. In some instances, calculating the distance between the data input and the reference signal based at least in part on the noise whitened output includes squaring the noise whitened output to yield a squared output, wherein the comparison value is calculated based at least in part on the squared output. In various instances, the bit position is a first bit position, the difference value is a first difference value, the noise whitened output is a first noise whitened output. In such instances, the methods further include: calculating a difference between the reference signal and the received input at a second bit position to yield a second difference value; noise whitening the second difference value to yield a second noise whitened output; squaring the first noise whitened output to yield a first squared output; squaring the second noise whitened output to yield a second squared output; and summing at least the first squared output and the second squared output to yield the comparison value.

Yet other embodiments of the present invention provide storage devices. Such storage devices include: a storage medium; a read/write head assembly disposed in relation to the storage medium and operable to derive a data input from the storage medium; an analog to digital converter circuit operable to convert the data input to a series of digital samples; an equalizer circuit operable to equalize the series of data samples to yield an equalized output; a distance calculation circuit operable to calculate a noise whitened distance between a reference signal and the equalized output to yield a comparison value; and a comparator circuit operable to compare the comparison value with a threshold value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference

DETAILED DESCRIPTION OF THE INVENTION

The present inventions are related to systems and methods for data processing, and more particularly to systems and methods for detecting patterns in a data stream.

Figure 1:
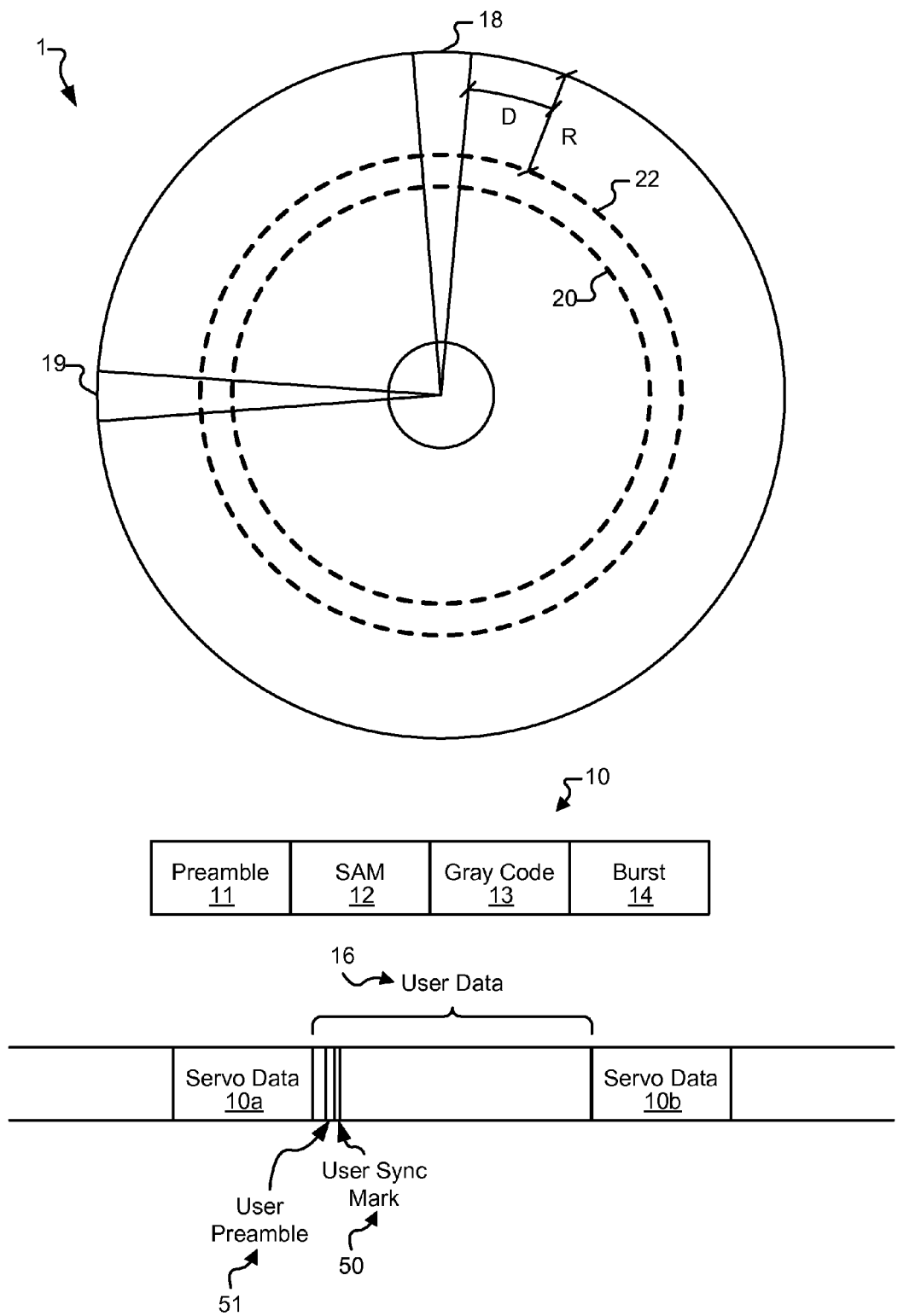
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, the servo data generally includes a preamble pattern 11 followed by a servo address mark 12 (SAM). Servo address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10*a* and 10*b*, a user data region 16 is provided. User data region 16 may include one or more sets of data that are stored to storage medium 1. The data sets may include user synchronization information some of which may be used as a mark to establish a point of reference from which processing of the data within user data region 16 may begin processing.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Once the user data region is reached, a user sync mark 50 is detected and used as a reference point from which data processing is performed. User sync mark 50 is preceded by a user preamble 51.

As used herein, the phrase "sync mark" is used in its broadest sense to mean any pattern that may be used to establish a point of reference. Thus, for example, a sync mark may be user sync mark 50 as is known in the art, or one or more portions of servo data bit patterns 10. Based upon the disclosure provided herein, one of ordinary skill in the art may recognize other sync marks that could be used in relation to different embodiments of the present invention.

Various embodiments of the present invention provide systems and methods for pattern detection. Such systems and methods may be used to, for example, detect a sync mark pattern or another pattern. The systems and methods utilize a noise whitened distance measurement to yield a comparison value. The magnitude of the comparison value corresponds to whether a reference signal has been detected or not. Such an approach considers noise correlation between proximate bit positions, and noise cancellation is applied using a noise whitening filter. As one of many advantages achievable, such noise reduction reduces the possibility of falsely identifying a pattern or failing to properly identify a pattern.

Figure 2A:
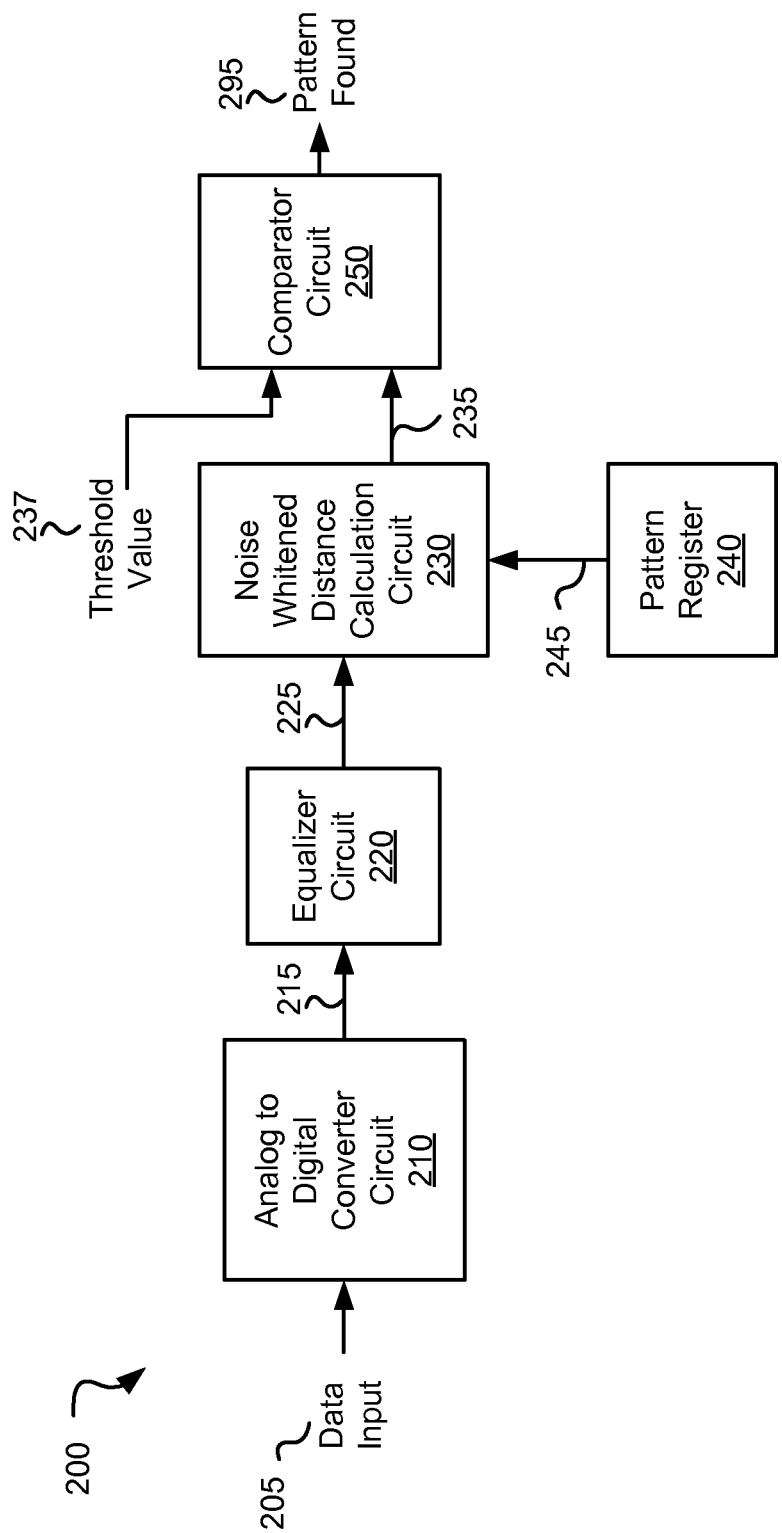
FIG. 2*a* depicts a noise whitened based pattern detector circuit in accordance with one or more embodiments of the present invention.

Turning to FIG. 2*a*, a noise whitened based pattern detector circuit 200 is shown in accordance with one or more embodiments of the present invention. Noise whitened based pattern detector circuit 200 includes an analog to digital converter circuit 210. Analog to digital converter circuit 210 receives a data input 205. Data input 205 is an analog signal. In some cases, data input 205 is derived from a storage medium. In other cases, data input 205 is derived from a transmission medium. Based upon the disclosure provided herein, one of ordinary skill in the art will recognize a variety of sources of data input 205. Analog to digital converter circuit 210 samples data input 205 and provides a series of data samples 215 corresponding to data input 205. Analog to digital circuit 210 may be any circuit known in the art that is capable of converting an analog input signal to a corresponding series of digital samples.

Data samples 215 are provided to an equalizer circuit 215. Equalizer circuit 215 may be any circuit known in the art that is capable of equalizing an input to a target, and providing an equalized output. In some embodiments, equalizer circuit 210 is a digital finite impulse response filter as are known in the art. Based upon the disclosure provided herein, one of ordinary skill in the art will recognize a variety of equalizer circuits that may be used in relation to different embodiments of the present invention. Equalizer circuit 220 provides an equalized output 225.

Equalized output 225 is provided to a noise whitened distance calculation circuit 230. Noise whitened distance calculation circuit 230 compares a series of values received as equalized output 225 with a reference signal 245. Reference signal 245 may be fixed or programmable, and is provided from a pattern register 240. Where reference signal 245 is programmable, pattern register 240 is accessible via a programming interface (not shown). In some cases, reference signal 245 may be a sync mark pattern indicating the start or end of an information set that is derived either from a storage medium or from a transmission medium. Noise whitened distance calculation circuit 230 performs a bit position by bit position noise whitened comparison of the received equalized output 225 with reference signal 245. The following equation describes the operation of noise whitened distance calculation circuit 230:

$$\text{Output} = \sum_{i=0}^{l} \left[ \sum_{k=0}^{m} f_k (\text{equalizer output}_{i-k} - \text{reference signal}_{i-k}) \right]^2,$$

where an m-tap noise whitening filter is used and $f_k$ represents the respective noise whitening filter taps, and l represents the number of bit positions that are compared (i.e., the number of bit positions in reference signal 245). Of note, the filter taps may be pattern dependent (e.g., tuned for a specific sync mark pattern or the like). In such a case, an index i could represent a bit position and the filter taps for each I may correspond to bit positions, i, i−1, i−2, i−3 . . . i−x. Noise whitened distance calculation circuit 230 provides the calculated output as a comparison value 235.

Comparison value 235 is provided to a comparator circuit 250 that compares comparison value 235 with a threshold value 237. Where comparison value 235 is less than threshold value 237, a pattern found output 295 is asserted. Comparator circuit 237 may be any circuit known in the art capable of comparing two or more signals and providing an output indicative of the comparison. Based upon the disclosure provided herein, one of ordinary skill in the art will recognize a variety of comparator circuits that may be used in relation to different embodiments of the present invention. Threshold value 237 may be programmable or fixed depending upon the particular implementation. In some cases, programmable threshold 237 varies based on a feedback signal (not shown). Based upon the disclosure provided herein, one of ordinary skill in the art will recognize a variety of implementations and/or sources of threshold value 237.

Figure 2B:
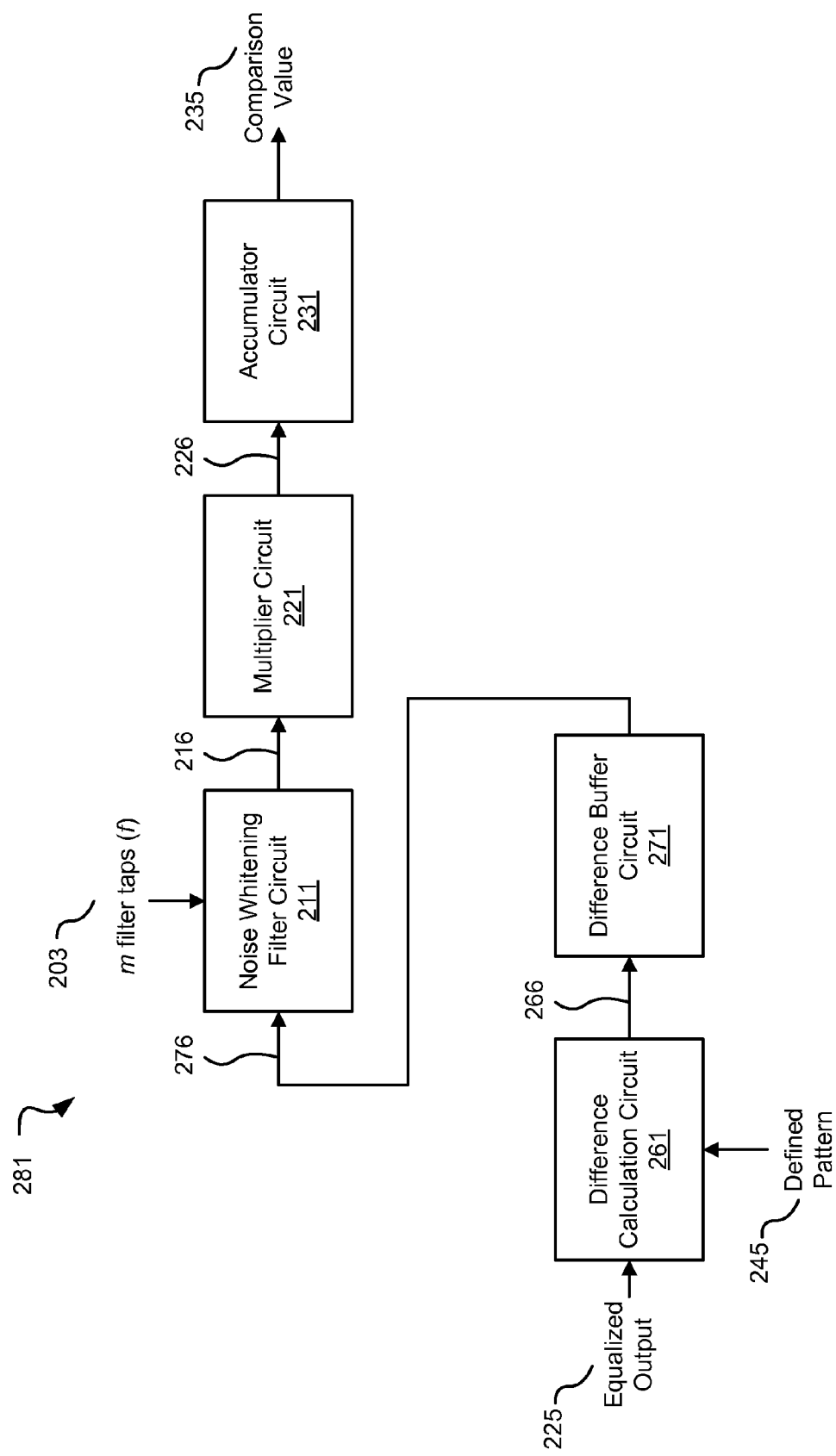
FIG. 2*b* shows one implementation of a noise whitened distance calculation circuit in accordance with some embodiments of the present invention.

Turning to FIG. 2b, one implementation of a noise whitened distance calculation circuit 281 is shown in accordance with some embodiments of the present invention. Noise whitened distance calculation circuit 281 may be used in place of noise whitened distance calculation circuit 230 of FIG. 2a. Noise whitened distance calculation circuit 281 includes a difference calculation circuit 261 that calculates a bit position by bit position difference between a received equalized output 225 and reference signal 245 in accordance with the following equation:

$$\text{Difference}_x = \text{equalizer output}_x - \text{reference signal}_x,$$

where x indicates a given bit position. The difference is provided as an output 266 to a difference buffer circuit 271 where the calculated difference values are stored. The stored difference values are provided as a difference output 276 to a noise whitening filter circuit 211 that operates to reduce the noise in any given bit position based upon an expected interaction with surrounding bits as indicated by m filter taps (f) 203. In particular, noise whitening filter 211 receives an equalized output 201 and provides a noise whitened output 216 in accordance with the following equation:

$$\text{noise whitened output} = \sum_{k=0}^{m} f_k(\text{equalizer output}_{i-k} - \text{reference signal}_{i-k}),$$

where k indicates one of a given noise whitening filter tap (e.g., $f_k$), and (i−k) indicates a given bit position. Of note, the aforementioned equation may be augmented with a mean subtraction term to remove any deterministic mean from the filter output value. Such a term is optional, but may be advantageous in systems where there is systematic misequalization.

Noise whitened output 216 is provided to a multiplier circuit 221 where it is squared to yield a squared output 226 in accordance with the following equation:

$$\text{squared output} = \left[\sum_{k=0}^{m} f_k(\text{equalizer output}_{i-k} - \text{reference signal}_{i-k})\right]^2.$$

Squared output 226 is provided to an accumulator circuit 231. Accumulator circuit 231 accumulates the squared output 226 for each bit position of the corresponding reference signal 245. In particular, accumulator circuit 231 performs an accumulation over l bit positions to yield a comparison output 241 in accordance with the following equation:

$$\text{comparison output} = \sum_{i=0}^{l}\left[\sum_{k=0}^{m} f_k(\text{equalizer output}_{i-k} - \text{reference signal}_{i-k})\right]^2.$$

Figure 3:
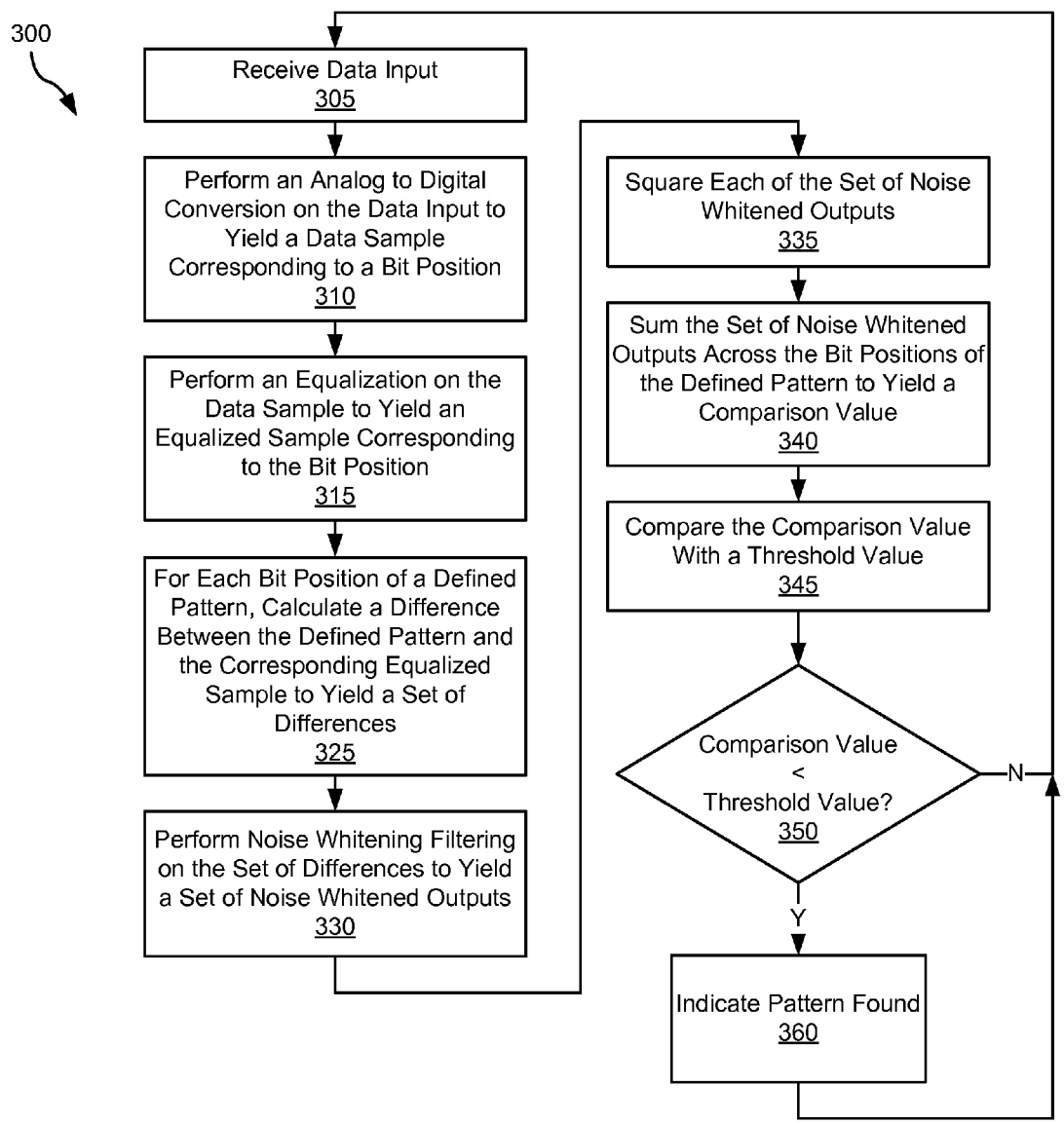
FIG. 3 depicts a method in accordance with one or more embodiments of the present invention for identifying a pattern.

Turning to FIG. 3, a flow diagram 300 shows a method for identifying a pattern in accordance with one or more embodiments of the present invention. Following flow diagram 300, data samples are received as a data input (block 305). The received data input may be derived from, for example, a storage medium or a communication medium. Based upon the disclosure provided herein, one of ordinary skill in the art will recognize a variety of sources of the data input. An analog to digital conversion is performed on the data input to yield a data sample corresponding to a particular bit position (block 310). The analog to digital conversion may be performed using any analog to digital conversion circuit or approach known in the art. An equalization is performed on the digital sample to yield an equalized sample corresponding to the bit position (block 315). The equalization may be done using any equalizer circuit or equalization method known in the art.

For each bit position of a reference signal, a difference between the reference signal and a corresponding equalized sample is calculated (block 325). As an example, the difference calculation may be done in accordance with the following equation:

$$\text{Difference}_x = \text{equalizer output}_x - \text{reference signal}_x,$$

where x indicates a given bit position. Noise whitening filtering is applied to a set of difference values to yield a set of noise whitened outputs (block 330). Such noise whitening filtering may be done in accordance with the following equation:

$$\text{noise whitened output}_i = \sum_{k=0}^{m} f_k(\text{Difference}_{i-k}),$$

where k indicates one of a given noise whitening filter tap (e.g., $f_k$), (i−k) indicates a given bit position, and i represents a noise whitened output for a given bit position. Of note, the filter taps may be pattern dependent (e.g., tuned for a specific sync mark pattern or the like). In such a case, an index i could represent a bit position and the filter taps for each I may correspond to bit positions, i, i−1, i−2, i−3 . . . i−x. Also, it should be noted that the aforementioned equation may be augmented with a mean subtraction term to remove any deterministic mean from the filter output value. Such a term is optional, but may be advantageous in systems where there is systematic misequalization.

Each of the noise whitened outputs are squared to yield a squared output (block 335). Such squaring may be done in accordance with the following equation:

$$\text{squared output}_i = (\text{noise whitened output}_i)^2.$$

Each of the squared outputs corresponding to the bit positions of reference signal are summed to yield a comparison value (block 340). The comparison value may be calculated in accordance with the following equation:

$$\text{comparison value} = \sum_{i=0}^{l} \text{squared output}_i,$$

where l corresponds to the number of bit positions in the reference signal. This comparison value is compared with a threshold value (block 345). Where the comparison value is less than the threshold value (block 350), a pattern found is indicated (block 360). In either case, the processes are repeated for the next received data input.

Figure 4:
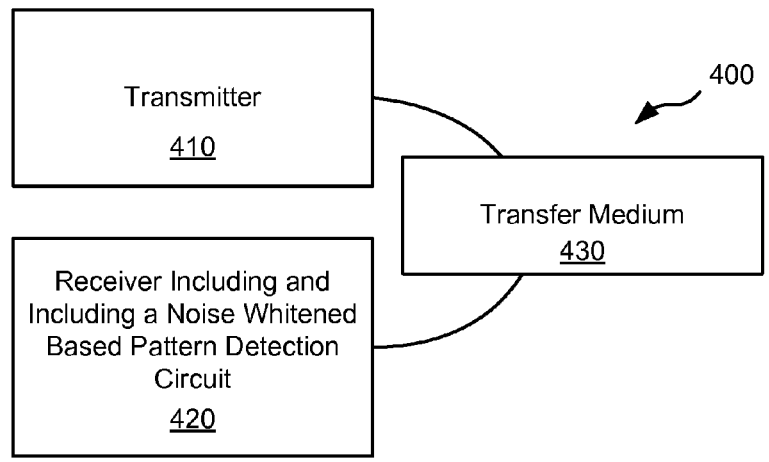
FIG. 4 depicts a communication system including a noise whitened based pattern detector circuit in accordance with different embodiments of the present invention.

Turning to FIG. 4, a communication system 400 including a receiver 420 with a noise whitened based pattern detector circuit is shown in accordance with different embodiments of the present invention. Communication system 400 includes a transmitter 410 that is operable to transmit encoded information via a transfer medium 430 as is known in the art. The encoded data is received from transfer medium 430 by receiver 420. Receiver 420 incorporates a noise whitened based pattern detector circuit. The noise whitened based pattern detector circuit may be similar to that discussed above in relation to one or more of relation to FIGS. 2a and 2b, and/or may operate in accordance with the method discussed above in relation to FIG. 3.

Figure 5:
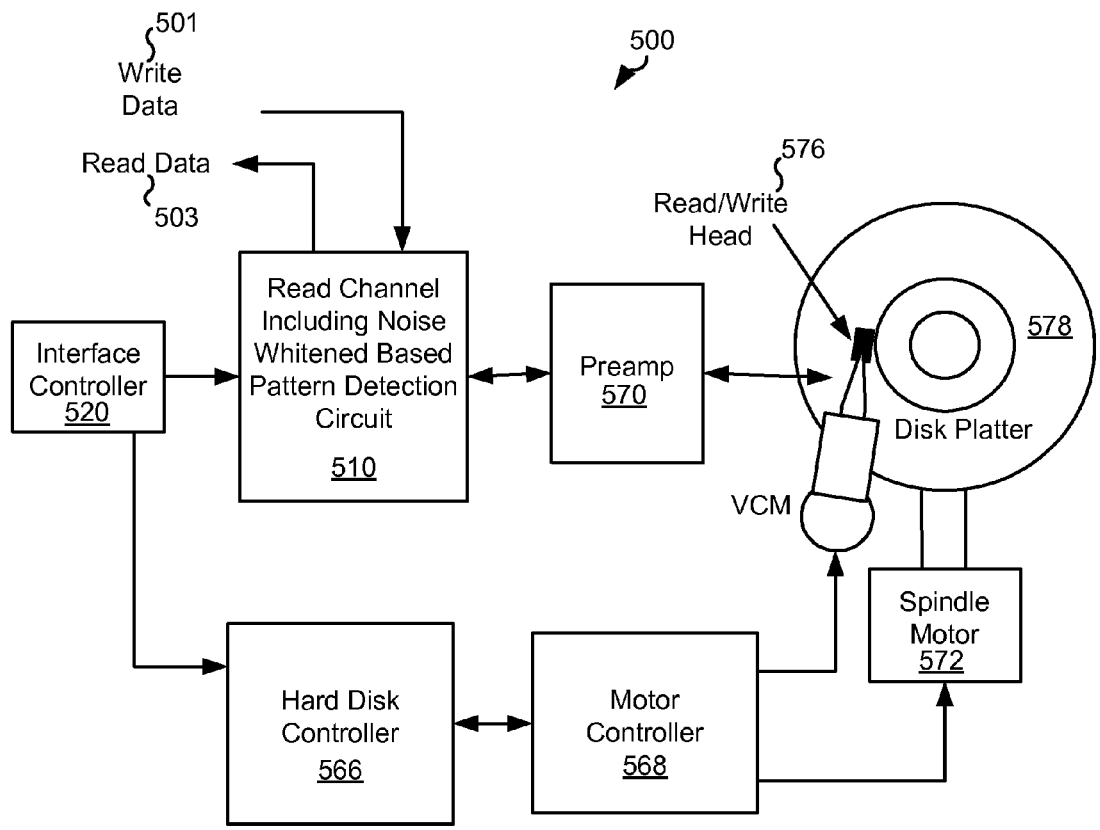
FIG. 5 shows a storage system including a noise whitened based pattern detector circuit in accordance with some embodiments of the present invention.

Turning to FIG. 5, a storage system 500 including a read channel circuit 510 with a non-threshold based sync mark detector circuit is shown in accordance with various embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 564 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. As part of decoding the received information, read channel circuit 510 performs a sync mark detection process. Such a sync mark detection process may be performed using a sync mark detector circuit that may be similar to one or more of those discussed above in relation to FIGS. 2a and 2b. The sync mark detection process may be done in accordance with the method discussed above in relation to FIG. 3. A write operation is substantially the opposite of the preceding read operation with write data 501 being provided to read channel circuit 510. This data is then encoded and written to disk platter 578.

It should be noted that storage system 500 may be integrated into a larger storage system such as, for example, a RAID (redundant array of inexpensive disks or redundant array of independent disks) based storage system. It should also be noted that various functions or blocks of storage system 500 may be implemented in either software or firmware, while other functions or blocks are implemented in hardware.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A pattern detection circuit, the circuit comprising:
    a distance calculation circuit operable to calculate a noise whitened distance between a predefined reference pattern and a received input to yield a comparison value, wherein the distance calculation circuit includes:
        a difference circuit operable to calculate a difference between the predefined reference pattern and the received input at a bit position to yield a difference value; and
        a noise whitening filter operable to noise whiten the difference value to yield the noise whitened distance; and
    a comparator circuit operable to compare the comparison value derived from the noise whitened distance with a threshold value.

2. The circuit of claim 1, wherein the comparator circuit is further operable to assert a pattern found signal when the comparison value is less than the threshold value.

3. The circuit of claim 1, wherein the distance calculation circuit further includes:
    a multiplier circuit operable to square the noise whitened distance output to yield a squared output.

4. The circuit of claim 3, wherein the bit position is a first bit position, wherein the difference value is a first difference value, wherein the noise whitened distance is a first noise whitened distance, wherein the squared output is a first squared output, and wherein:

the difference circuit is further operable to calculate a difference between the predefined reference pattern and the received input at a second bit position to yield a second difference value;

the noise whitening filter is further operable to noise whiten the second difference value to yield a second noise whitened distance;

the multiplier circuit is operable to square the second noise whitened distance to yield a second squared output; and an accumulator circuit operable to sum at least the first squared output and the second squared output to yield the comparison value.

5. The circuit of claim 1, wherein the circuit further comprises:

a pattern register operable to maintain the predefined reference pattern.

6. The circuit of claim 5, wherein the pattern register is programmable.

7. The circuit of claim 1, wherein the comparison value is calculated in accordance with the following equation:

$$\text{comparison output} = \sum_{i=0}^{l}\left[\sum_{k=0}^{m} f_k(\text{received input}_{i-k} - \text{defined pattern}_{i-k})\right]^2,$$

wherein l corresponds to the number of bit positions of the predefined reference pattern, m corresponds to the number of taps of a noise whitening filter, i−k corresponds to a particular bit position, and $f_k$ represents a particular tap of the noise whitening filter.

8. The circuit of claim 1, wherein the circuit is implemented in an integrated circuit.

9. The circuit of claim 1, wherein the circuit is implemented as part of a device selected from a group consisting of: a storage device, and a communication device.

10. A method for pattern detection, the method comprising:
receiving a data input;
receiving a predefined reference pattern;
calculating a difference between the predefined reference pattern and the received input at a bit position to yield a difference value;
noise whitening the difference value to yield a noise whitened output; and
calculating a distance between the data input and the predefined reference pattern based at least in part on the noise whitened output to yield a comparison value.

11. The method of claim 10, wherein calculating the distance between the data input and the predefined reference pattern based at least in part on the noise whitened output includes:
squaring the noise whitened output to yield a squared output, wherein the comparison value is calculated based at least in part on the squared output.

12. The method of claim 10, wherein the bit position is a first bit position, wherein the difference value is a first difference value, wherein the noise whitened output is a first noise whitened output, and wherein the method further comprises:
calculating a difference between the predefined reference pattern and the received input at a second bit position to yield a second difference value;
noise whitening the second difference value to yield a second noise whitened output;

squaring the first noise whitened output to yield a first squared output;
squaring the second noise whitened output to yield a second squared output; and
summing at least the first squared output and the second squared output to yield the comparison value.

13. The method of claim 12, wherein:
calculating the difference between the predefined reference pattern and the received input is done in accordance with the following equation:

$$\text{Difference}_x = \text{received input}_x - \text{defined pattern}_x,$$

wherein x indicates a given bit position;
noise whitening the difference value is done in accordance with the following equation:

$$\text{noise whitened output} = \sum_{k=0}^{m} f_k(\text{Difference}_{k-m}),$$

wherein k indicates one of a given noise whitening filter tap, $f_k$ is the filter tap value, and (k−m) indicates a given bit position;
squaring the noise whitened output is done in accordance with the following equation:

$$\text{squared output}_i = (\text{noise whitened output}_i)^2,$$

wherein i indicates a bit position; and
summing at least the first squared output and the second squared output to yield the comparison value is done in accordance with the following equation:

$$\text{comparison value} = \sum_{i=0}^{l} \text{squared output}_i.$$

14. The method of claim 10, wherein the method further comprises:
comparing the comparison value with a threshold value; and
asserting a pattern found signal based at least in part on the comparison between the comparison value and the threshold value.

15. The method of claim 10, wherein noise whitening the difference value to yield a noise whitened output is done in accordance with the following equation:

$$\text{noise whitened output} = \sum_{k=0}^{m} f_k(\text{Difference}_{k-m}),$$

wherein k indicates one of a given noise whitening filter tap, $f_k$ is the filter tap value, and (k−m) indicates a given bit position.

16. The method of claim 10, wherein calculating the difference between the predefined reference pattern and the received input at a bit position to yield a difference value is done in accordance with the following equation:

$$\text{Difference}_x = \text{received input}_x - \text{defined pattern}_x,$$

wherein x indicates a given bit position.

17. A storage device, the storage device comprising:

a storage medium;

a read/write head assembly disposed in relation to the storage medium and operable to derive a data input from the storage medium;

an analog to digital converter circuit operable to convert the data input to a series of digital samples;

an equalizer circuit operable to equalize the series of data samples to yield an equalized output;

a distance calculation circuit operable to calculate a noise whitened distance between a predefined reference pattern and the equalized output to yield a comparison value, wherein the distance calculation circuit includes:

a difference circuit operable to calculate a difference between the predefined reference pattern and the received equalized output at a bit position to yield a difference value; and a noise whitening filter operable to noise whiten the difference value to yield the noise whitened distance; and a comparator circuit operable to compare the comparison derived from the noise whitened distance with a threshold value.

18. The storage device of claim 17, wherein the distance calculation circuit further includes:

a multiplier circuit operable to square the noise whitened output to yield a squared output.

19. The storage device of claim 18, the difference value is a first difference value corresponding to a first bit position; wherein the noise whitened distance is a first noise whitened distance, wherein the squared output is a first squared output, and wherein:

the difference circuit is further operable to calculate a difference between the predefined reference pattern and the received input at a second bit position to yield a second difference value;

the noise whitening filter is further operable to noise whiten the second difference value to yield a second noise whitened distance;

the multiplier circuit is operable to square the second noise whitened distance to yield a second squared output; and an accumulator circuit operable to sum at least the first squared output and the second squared output to yield the comparison value.

20. The storage device of claim 17, the storage device further comprises:

a programmable pattern register operable to maintain the predefined reference pattern.

\* \* \* \* \*